US006366925B1

(12) United States Patent
Meltzer et al.

(10) Patent No.: US 6,366,925 B1
(45) Date of Patent: Apr. 2, 2002

(54) NETWORK BASED LEGAL SERVICES SYSTEM

(75) Inventors: Robert C. Meltzer; Melissa E. Garber, both of Chicago, IL (US)

(73) Assignee: American Services Network, PC, Chicago, IL (US)

( * ) Notice: Subject to any disclaimer, the term of this patent is extended or adjusted under 35 U.S.C. 154(b) by 0 days.

(21) Appl. No.: 09/225,059

(22) Filed: Jan. 4, 1999

(51) Int. Cl.[7] .............................................. G06F 17/00
(52) U.S. Cl. .............................. 707/104; 707/10; 705/1; 709/218
(58) Field of Search ................................ 707/2, 3, 200, 707/104, 10; 705/27, 20, 7, 1; 709/218

(56) References Cited

U.S. PATENT DOCUMENTS

| | | | | |
|---|---|---|---|---|
| 4,939,689 A | * | 7/1990 | Davis et al. ................ 364/900 |
| 5,301,350 A | * | 4/1994 | Rogan et al. ................ 395/800 |
| 5,446,575 A | * | 8/1995 | Lysakowski, Jr. ...... 395/200.01 |
| 5,452,459 A | * | 9/1995 | Drury et al. ................ 395/700 |
| 5,551,028 A | * | 8/1996 | Voll et al. ................... 395/600 |
| 5,835,712 A | * | 11/1998 | DuFresne ..................... 705/27 |
| 5,874,955 A | * | 2/1999 | Rogowitz et al. ........... 345/339 |
| 5,875,431 A | * | 2/1999 | Heckman et al. ............... 705/7 |
| 5,894,585 A | * | 4/1999 | Inoue et al. ................. 395/827 |
| 6,029,141 A | * | 2/2000 | Bezos et al. .................. 705/27 |
| 6,085,189 A | * | 7/2000 | Pirahesh et al. ............... 707/3 |
| 6,085,976 A | * | 7/2000 | Sehr .......................... 235/384 |
| 6,119,100 A | * | 9/2000 | Walker et al. ................ 705/20 |

* cited by examiner

Primary Examiner—Hosain T. Alam
Assistant Examiner—Tam Nguyen
(74) Attorney, Agent, or Firm—Sonnenschein, Nath & Rosenthal

(57) ABSTRACT

A system for conducting legal services, including: an interrogative interface via which clients input information relevant to matters in connection with which the legal service is engaged; a retainer acknowledgment interface via which the clients acknowledges engaging the legal service provider to perform a legal service; a query interface via which the clients can post inquiries to the legal services provider; and a database comprising information relating to the status of matters for which clients have engaged the legal service provider.

20 Claims, 14 Drawing Sheets

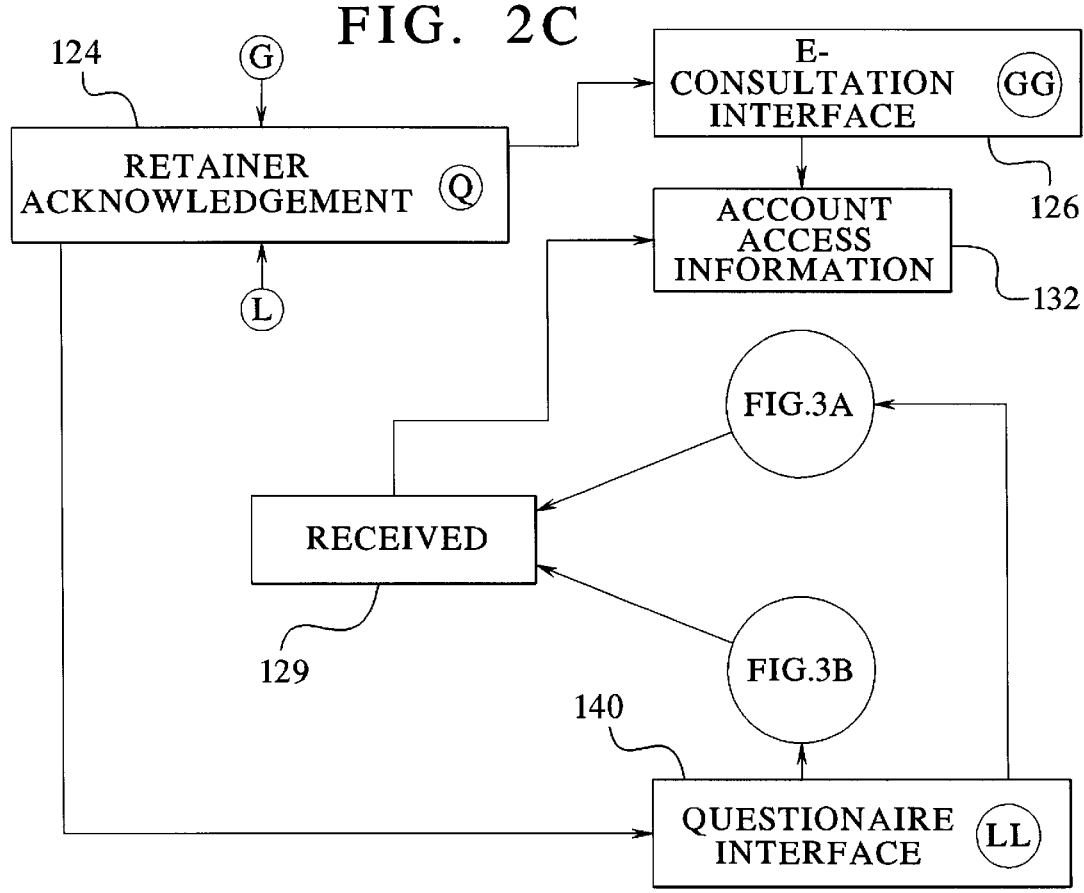
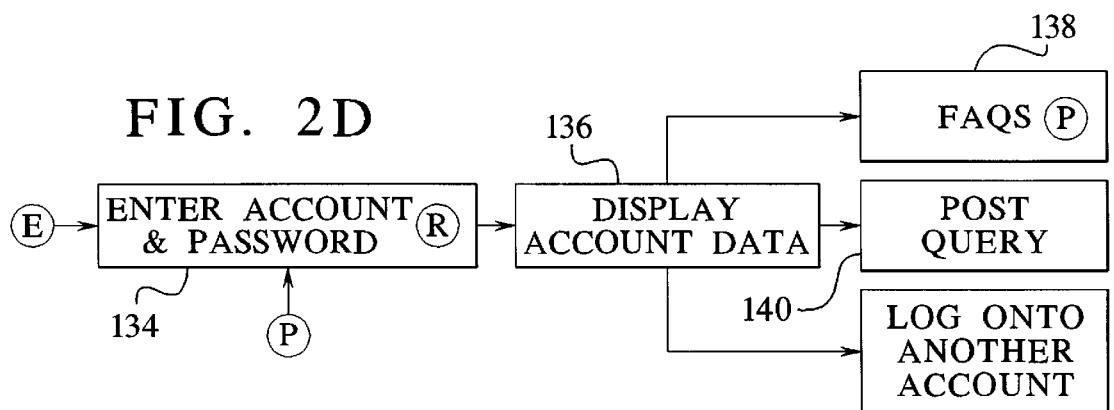
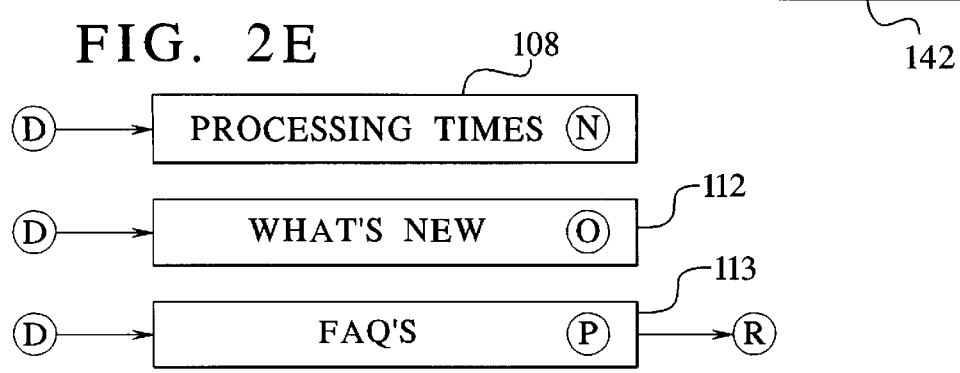

FIG. 4A

*A-1 Questionnaire*

YOU MUST FULLY COMPLETE THIS QUESTIONNAIRE. IF YOU DO NOT COMPLETE AND SUBMIT THE QUESTIONNAIRE NOW YOU WILL NOT BE ABLE TO RETURN TO IT WITHOUT STARTING THE PROCESS AGAIN AND OPENING A NEW ACCOUNT.

Family Name
SMITH

Given Name
JIM

M.I.
Q

Address-In Care Of:
N/A

Street Number and Name, Apt#
123 MAIN STREET

City
ANYCITY

State
ANYSTATE

Zip Code
ANYZIP

Date Of Birth

FIG. 4B 01-02-03

Country Of Birth

CANADA

Social Security # (if any)

123456

A # (if any)

123456

Date of Last Arrival Into the U.S.

N/A

I-94 #

123456

Current Non-immigrant Status

N/A

Expires on (mm/dd/yy)

N/A

Passport Information:

Country of Issuance

CANADA

Valid to (mm/dd/yy)

01-02-2000

Foreign Address: Street # and Name, Apt. #

123 MAIN STREET

City or Town

FIG. 4C

_____ANYCITY_____

State or Province

_____ANYSTATE_____

Country

_____CANADA_____

Zip or Postal Code

_____ANYZIP_____

I request that my current or requested status be extended until:

_____N/A_____

If this change/extension of status is based on a change/extension already granted to your spouse, child or parent or pending with INS please supply the receipt number:

_____N/A_____

Are you or any other person in this application an applicant for an immigrant visa?

○ Yes              ● No

Has an immigrant petition ever been filed for you, or any other person in this application?

○ Yes              ● No

Have you, or any other person included in this application ever been arrested or convicted of any criminal offense since last entering the U.S.?

○ Yes              ● No

Have you, or any other person included in this application done anything which violated the terms of the non-immigrant visa you now hold?

○ Yes              ● No

Are you, or any other person in this application, now in exclusion, deportation or removal proceedings?

FIG. 4D

○ Yes                               ● No

Have you, or any other person included in this application been employed in the U.S. since last admitted or granted an extension or change of status?

○ Yes                               ● No

If you answered yes to any questions please give details below.

Email Address for ASN correspondence

JIM@EMAIL.COM

Name and Mailing Address for ASN document correspondence

123 MAIN STREET, ANYCITY, CANADA, ANYZIP      

                                             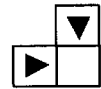

| Submit | Reset |

American Services Network, P.C.
Chicago, IL
http://www.visanow.com

Copyright © 1998. American Services Network, P.C. All rights reserved.

FIG. 5

Administration Page

| Account Folder Number | Name | Service Description | Account Status | Date | Processed |
|---|---|---|---|---|---|
| 10618 | JOAN Q PUBLIC | eConsultation | Open | 9/7/98 4:34:30 PM | N |
| 10617 | JIM SMITH | A-1+Visa | Open | 9/7/98 4:22:12 PM | N |
| 10616 | Ryan Cashlow | COMBINATION+1 | closed | 9/3/98 1:55:25 PM | Y |
| 10615 | John Doe | H-2B + Visa | Open | 9/2/98 1:19:58 PM | Y |

*Your Account*

Account Status      Responses      Account Balance      Submit Questions

| Name | Access Number | Date |
|---|---|---|
| JIM SMITH | 10617 | 9/7/98 4:22:12 PM |
| Account Status | | |
| Date | Activity | |
| Responses to Previously Submitted Questions | | |
| Date | Response | |
| Account Balance | | |

| Date | Service | Charge | Paid | Balance Due |
|---|---|---|---|---|
| 9/7/98 4:22:12 PM | A-1 + Visa | $ 500.00 | $ 0.00 | $ 500.00 |

Log into another account

Submit Question

Before sibmitting your question please review Frequently Asked Questions, and submit any further questions below.

FIG. 7A

Administration Page

Account Number | Name | Status
10617 | JIM SMITH | Open

U.S. Social Security Number or Passport Number | Password
1234567890 | JIM

Credit Card Number | Exp. Date
1234567890 | 1234

E-Mail
JIM@EMAIL.COM

Address
123 MAIN STREET

City | State | Zip
ANYCITY | ANYSTATE | ANYZIP

Province | Country
ANYPROVINCE | CANADA

Service | Fee | Paid
A-1 | $500.00 | $0.00

Credit Card Response

Internet Response
0

Submit

FIG. 7B

| Detail | |
|---|---|
| accountno | 10617 |
| Current Nonimmigrant status | N/A |
| INS receipt # of change/extn of family member | N/A |
| Family name | SMITH |
| City | ANYCITY, ANYCITY |
| Date of birth | 01-02-03 |
| Date of last arrival to US | N/A |
| First name | JIM |
| address | N/A |
| Foreign address | 123 MAIN STREET |
| MI | Q |
| Street | 123 MAIN STREET |
| State/Province | ANYSTATE |
| Country | CANADA |
| Now in depo proceedings | no |
| State | ANYSTATE |
| Request extension of status until | N/A |
| Zip code | ANYZIP, ANYZIP |
| Country of birth | CANADA |
| NI expiration date is | N/A |
| Country that issued passport is | CANADA |
| Criminal offense | no |
| email | JIM@EMAIL.COM |
| Social security # | 123456 |
| A # | 123456 |
| Ever violate current NI status | no |
| Details to any of the above | |
| I-94 # | 123456 |
| Passport is valid until | 01-02-2000 |
| Immigrant visa applicant | no |
| Immigrant visa petition ever filed | no |
| name & add for mailing docs | 123 MAIN STREET, ANYCITY, CANADA ANYZIP |
| Employed since last admit/extn | no |
| B1 | Submit |

FIG. 7C

Account Questions

Question Responses

Add Response

Status

Add Status

Return to Account List

NETWORK BASED LEGAL SERVICES SYSTEM

PARTIAL WAIVER OF COPYRIGHT PURSUANT TO 1077 O.G. 22 (Mar. 20, 1987)

All of the material in this patent application is subject to copyright protection under the copyright laws of the United States and of other countries. As of the first effective filing date of the present application, this material is protected as published material, and to the extent not already subject to protection for published material, as unpublished material.

However, permission to copy this material is hereby granted to the extent that the owner of the copyright rights has no objection to the facsimile reproduction by anyone of the patent document or patent disclosure, as it appears in the United States Patent and Trademark Office patent file or records, but otherwise reserves all copyright rights whatsoever.

BACKGROUND OF THE INVENTION

The present invention relates generally to network based systems for processing information provided thereto by a client via an interrogative interface. More particularly, the invention relates to Internet based systems and/or websites on the world wide web which process information provided by users visiting the websites.

A variety of websites present an interrogative interface such as questionnaire or form to a visitor in order to receive information from the visitor. Particular examples include questionnaires posed to visitors in order to effect a registration and questionnaires posed to visitors in order to effect a purchase of a product. See, e.g., "www.dell.com" and "www.gateway.com." Thus, as used herein, the term "interrogative interface" means a computer-generated interface in which a user provides information in response to questions or entry blanks (e.g., a business form format). The questions and/or responses may be communicated by any of various input devices including keyboards, touch screens, speech recognition systems, handwriting recognition systems, and pointing devices, to name a few.

The manner in which the information is used and/or processed is as varied as the applications to which the information is pertinent. Further, the problems which these various systems are intended to address are similarly varied.

One recent U.S. Pat. No. 5,832,477, the disclosure of which is incorporated herein by reference, describes an automated system for providing real-time verification of health insurance eligibility. According to the abstract:

> Data from a health care provider computer system is used to automatically request real-time electronic insurance eligibility verification information from health care insurance payers. A patient health insurance verification computer system is operatively connected to a patient registration computer system. The verification computer system obtains a data output stream such as a print image from the registration computer system. This data output stream is captured and broken down into separate data fields. The insurance carrier is determined, and the verification computer system determines which electronic data source to request patient eligibility data from. The verification computer system reformats the captured data to fit the data format required by the data source, establishes a communications link to the data source, and sends the reformatted data to the data source. The data source sends responsive patient specific eligibility data which the verification computer system uses to automatically verify insurance coverage. Health insurance verification becomes much more reliable since no human intervention is required to carry on the automatic verification process. Additionally, automatic verification can be performed conveniently without double data entry even in environments with preexisting admissions systems that cannot be easily modified.

This system also could be implemented over the Internet or some private network, depending on the target users.

SUMMARY OF THE INVENTION

An object of the invention is to provide a legal services network that automates the receipt of information from a client, provides a secure attorney-client communication channel, and a data base format that enables an attorney to administer a plurality and variety of matters.

To that end, in an embodiment, the invention provides a network-based system in which a client may contract in real-time for the provision of legal services via a computer interface without directly contacting an attorney, transmit attorney-client communications to the legal services provider, and receive attorney-client communications from the legal services provider.

In a more particular embodiment, the invention provides a network based system for the provision of legal services via the world wide web, having:

(a) an interrogative interface via which a client submits information relevant to a legal service matter in connection with which a legal service provider is engaged;

(b) a retainer acknowledgment interface via which the client acknowledges engaging the legal service provider to perform a legal service;

(c) a query interface via which the client can post inquiries to the legal services provider; and (d) a database comprising information relating to the status of one or more legal service matters for which the client has engaged the legal service provider.

As used herein, the term "immigration/naturalization" means and refers to legal processes for effecting immigration visas, non-citizen work permits or naturalizations (citizenship awards). Thus an "immigration/naturalization" application can refer to an application or form submitted to a legal service provider by a client engaging the service provider to assist the client in obtaining an immigrant or non-immigrant visa, work permit or naturalization, to an application (generally in the format of a completed form) submitted to the appropriate governmental authority, such as the United States Immigration and Naturalization Service.

In an embodiment, the invention provides a system for the processing of an immigration/naturalization application by a service provider over a network in which:

a client is presented via a computer interface with a variety of application categories from which to select one for processing;

the client is then presented via a computer interface with a retainer agreement which must be acknowledged before the client is permitted to proceed within the system;

the client is presented via a computer interface with a questionnaire for inputting data used by the system to prepare an immigration/naturalization application on behalf of the client;

the client is notified via e-mail as to any further information which the client must supply in order to perfect the immigration/naturalization application filing;

the client is provided with hard copies of any forms which require signature; and the service provider submits and administers the immigration/naturalization application on behalf of the client.

In an embodiment, the invention provides a system for processing of an immigration/naturalization application by a legal services provider, comprising:

(a) an interrogative interface via which a client inputs personal data relevant for an immigration/naturalization application;

(b) a retainer interface via which the client acknowledges engaging the legal services provider and submits a payment;

(c) a query interface via which the client can post inquiries to the legal services provider;

(d) a computer database comprising data relating to various matters for which the legal services provider has been engaged;

(e) an administrative interface comprising a matrix for listing matters for which the legal services provider has been engaged and data including the status of such matters.

In an embodiment, the invention provides a legal services system, comprising:

one or more servers on which a database and a set of HTML files are located; and a network to which said one or more servers are connected; wherein, said HTML files include a dynamically interactive interrogative interface via which a remote user accessing the HTML files is presented with a succession of questions, each succeeding question being selected based upon a response to a preceding question; and said HTML files include a retainer acknowledgment interface via which said remote user acknowledges retaining a legal services provider in connection with a legal service.

In an embodiment, the invention provides a system for providing immigration/naturalization legal services to a client comprising:

(a) one or more servers operatively connected to a network;

(b) an interrogative interface via which said client can submit data useful in completing a governmental form for immigration/naturalization;

(c) a retainer acknowledgment interface via which said client submits a payment;

(d) a query interface via which said client can post inquiries; and (e) an account access interface via which said client can new information relating to processing of data submitted via said interrogative interface.

In an embodiment, the invention provides a legal services network-based system, comprising:

a network;

a database comprising information relating to matters for which a legal services provider has been engaged including queries posed by clients and responses thereto;

one or more remotely accessible servers on which said database is stored;

an administration interface for accessing information in said database, said administration interface being only accessible by said legal services provider;

a retainer acknowledgment interface via which clients acknowledge engagement of the legal services provider; and a software module which accepts a question submitted by the client and processes same only if a client has acknowledged engagement of the legal services provider and submitted a payment via the retainer acknowledgment interface.

In an embodiment, the invention provides a method of providing legal services over a network comprising the steps of:

(a) providing a set of HTML files accessible via the network;

(b) receiving an acknowledgment of engagement of a legal services provider from a remote client via one of said HTML files;

(c) receiving data from said remote user via an interrogative interface, said data for use by the legal services provider providing said legal services;

(d) providing a query interface via which said remote client can post inquiries to said legal services provider, providing an account access interface via which said remote user can view information as to progress of said legal services for which said legal services provider is engaged by said remote client.

These and other features and aspects of the invention are set forth in greater detail below in the following detailed description of the presently preferred embodiment with reference to the accompanying drawings.

BRIEF DESCRIPTION OF THE DRAWINGS

FIGS. 2A–2E illustrate the web pages through which a client must wend in order to engage the services of a legal services provider and to receive such services.

FIGS. 4A–4D illustrate an interrogative interface file useful for a client to input data into the system described herein.

FIG. 5 illustrates a system administration database matrix useful in the system described herein.

FIG. 6 illustrates a response page provided to a client who requests their account information.

FIGS. 7A–7C illustrates an account administration interface useful in administrating accounts in the system described herein.

DETAILED DESCRIPTION OF THE PRESENTLY PREFERRED EMBODIMENTS

In a broad sense, the present invention essentially provides a means for automating the practice of law via a network, preferably the Internet. More particularly, the invention provides a means for the delivery of legal services via the world wide web.

Accompanying this application is an Appendix, fully incorporated herein by reference, which comprises a printout of files or web pages presented to a client navigating through the presently preferred system. References are made herein to specific pages therein for ease of reference. The system is also available on the worldwide web at the URL "www.visanow.com." This site and/or the information published thereat is incorporated herein to the extent permitted by law.

Figure 1:
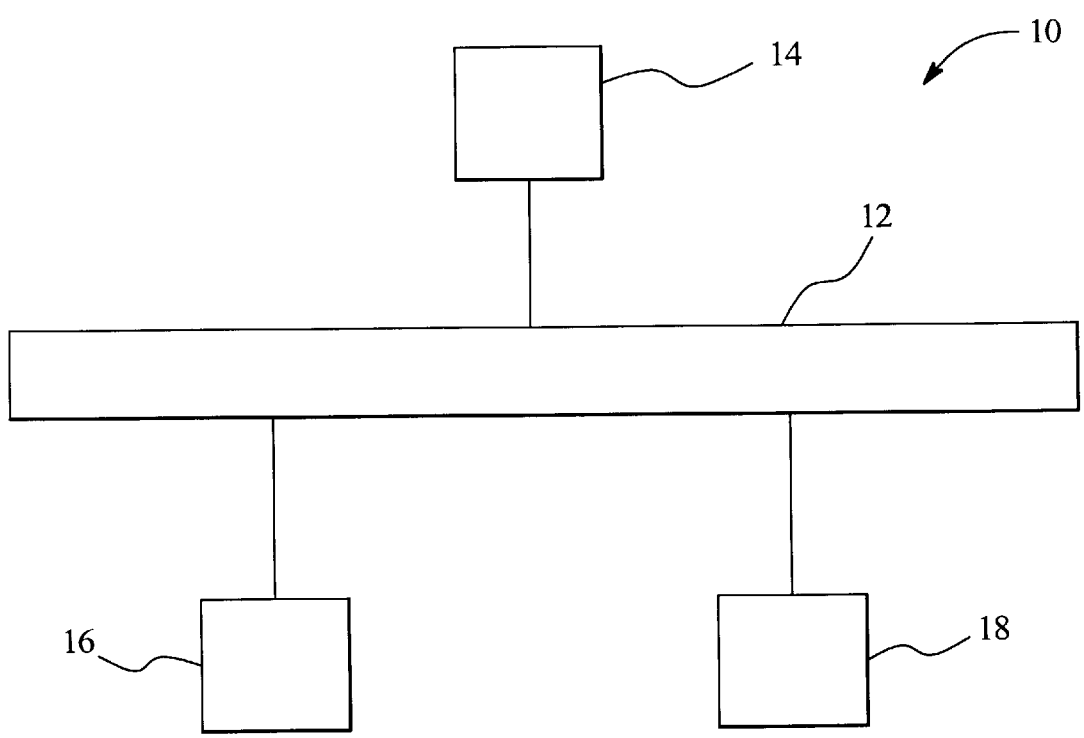
FIG. 1 illustrates a system with which the invention can be practiced.

In FIG. 1 there is illustrated a system 10 with which the invention can be practiced. The system 10 comprises a network 12 such as the Internet or other suitable network, albeit private or public. Connected to the network 12 by suitable means is a server (or group of servers) 14 on which are stored a legal service provider's files, some of which are to be accessed by a remote or client computer 16. The remote computer 16 is referred to herein also as a client computer, or simply client, when appropriate. Further, a person or user accessing the files via the client computer can be referred as a client (or, more appropriately, a potential client in a legal engagement context). Distinctions herein, to the extent important, generally should be readily understood. Finally, there is also illustrated a remote administrator's computer 18 which also can access files on the server 14.

As can be appreciated, the computers 16 and 18 can be connected to the network in a variety of ways, e.g., via dial-up access or direct connection, to mention at least two. Since the system herein is described in terms of an immigration visa application system, it is envisioned that most of the connections of the remote computers to the network will be made via dial-up access, such as through an Internet access provider account.

In that regard, the network 12 then preferably comprises the Internet and the files on the server 14 comprises hypertext mark-up language files (HTML) such as are commonly accessed over the world wide web. Further, while only one server 14 is illustrated, in actuality, the files could be distributed throughout various servers, as is known.

In any event, in the embodiment set forth in the figures, a system preferably is provided for the delivery of legal services in the field of immigration law. In particular, the illustrated system facilitates the processing of immigration/naturalization applications, i.e., applications for immigration into the United States as well as applications for naturalization or citizenship. Familiarity with basic terms used in the field of immigrant law is assumed. However, it is to be understood that the described embodiment is for illustrative purposes only, as the invention has application in other areas.

In the illustrated embodiment, the system provides a network access site, preferably a world wide web site which a client can visit using known browser software packages. Such sites comprise hypertext mark-up language (HTML) files.

As is typical for sites on the world wide web, in addition to textual information and/or other multimedia information, the pages include hyperlinks to other pages or sites or HTML files, which can also be considered interfaces. Unless otherwise noted herein, the terms web site, web page, page and HTML file are used interchangeably herein. Thus, the client can be redirected to specific interfaces, depending upon the hyperlink chosen.

In addition to a home page (see Appendix page 1), the following basic web pages or files are provided in the presently preferred embodiment:

(a) "Get Your Visa Now" (see Appendix page 2)
(b) "ASN$^{SM}$ VISA Application Procedure" (see Appendix pages 3–4)
(c) "Select Your Visa" (see Appendix pages 5–6)
(d) Application Category Selection Indication File (see Appendix pages 7–8)
(e) "Visa Select$^{SM}$ (see Appendix pages 9 and 48–49)
(f) "E-Consultation$^{SM}$SM" (see Appendix pages 10–11)
(g) Retainer Acknowledgment (see Appendix pages 12–15)
(h) "A-1 Questionnaire" (see Appendix pages 16–19 and FIGS. 4A–4D)
(i) "Visa Info You Need" (see Appendix page 21)
(j) "Frequently Asked Questions" (see Appendix pages 22–23)
(k) "Eligibility" (see Appendix pages 24–34)
(l) "Processing Times" (see Appendix pages 35–39)
(m) "What's New" (see Appendix pages 40–43)
(n) "Your Account" (see Appendix page 45)
(o) Your Account response (see Appendix pages 46–47 and FIG. 7)
(p) Sitemap (see Appendix pages 70–72)
(q) "About ASN" (see Appendix pages 74–76)
(r) "Disclaimers" (see Appendix pages 77–78)
(s) Account Administration page (see FIGS. 7A–7C)
(t) System Administration page (see FIG. 5)

The home page provides a file containing only the most basic information about the service. This page is the page to which a client is linked or directed to when using the basic URL for the system.

FIGS. 2A–2E provides a diagram illustrating an overview of the hyperlinking logic of the various pages or web sites making up the presently preferred system embodiment of principles of the invention. As illustrated, after a client or visitor enters the system via the home page the client then continues the process by selecting an appropriate link. In the presently preferred embodiment, the home page includes a basic textual and graphical interface and HTML links to various files/interfaces of the system. Via an adjacent first frame, a client can hyperlink to the following areas of the system:

"Get Your Visa Now"
"Visa Info You Need"
"Your Account"
"Visa Select$^{SM}$"
"E-Consultation$^{SM}$"

Via a second adjacent frame, typically in the form of a task bar arrangement located at the bottom of the displayed information, hyperlinks are provided to the following files/interfaces:

"About ASN"
Sitemap
Search
"Disclaimers"
"Get Your Visa Now"
"Visa Info You Need"
"E-Consultation$^{SM}$"
"Visa Select$^{SM}$"
"Your Account"
Home Page In the Appendix, shortened names are used for these files.

Of course, the home page, as well as any other page can be formed using frames so that the foregoing second frame's linking selection is presented in a menu adjacent each page discussed herein. As is well-known, "frames" is the use of multiple, independently controllable sections on a web presentation. This effect is achieved by building each section as a separate HTML file and having one "master" HTML file identify all of the sections. When a user or client requests a web page that uses frames, the address requested is actually that of the "master" file that defines the frames. The result of the request is that multiple HTML files are returned, one for each visual section. Links in one frame can request another file that will appear in another (or the same) frame. A typical use of frames is to have one frame containing a selection menu in one frame and another frame that contains the space where the selected files (i.e., the linked to files) appear. See, "www.whatis.com" for more information about this and other terms utilized in connection with the Internet and the world wide web.

In the presently preferred embodiment, a lower frame, such as the second frame is presented to a client to enable the client to hyperlink to the various sites mentioned above. These sites or files are described next.

The Files

"Get Your Visa Now"

This file is a simple informative file that describes the three major steps to be undertaken by a client, namely: (1) to select a visa category, (2) to read and sign a retainer agreement, and (3) to complete and submit a questionnaire to the legal services provider. Benefits of the system to the client are also noted. Hyperlinks to the "Select Your Visa" and "ASN Visa Application Procedure" files are provided.

"ASN Visa Application Procedure"

This file is a text file that describes in detail the procedures to be undertaken by the client and the legal services provider through the system described herein. This procedure is described in detail below. There is also a hyperlink to the "Select Your Visa" file.

Retainer Acknowledgment

This file is a mostly textual file wherein there is set forth a contract between the legal services provider and a client. At the end of the agreement, there is provided and interface via which a client can positively indicate agreement with and acceptance of the contract such as via checking a box. Further, the interface provides for the submission of a retainer payment through the submission of credit card information and payment authorization. In the known ways, this information can be transmitted through a secure connection.

"Visa Info You Need"

This file essentially provides hyperlinks to the files: "Frequently Asked Questions," "Eligibility," "Processing Times" and "What's New." Short descriptions of these files are also provided.

"About ASN"

This site provides the client with background information as to the sight owner (i.e., the legal services provider), personnel and the legal services provided. The information is mostly textual as can be discerned in the relevant pages of the Appendix hereto, and can also include audio or visual presentations. The site also has a hyperlink to the site or file "ASN$^{SM}$ VISA Application Procedure" which provides an explanation of the procedure which the client in completing and application and the request for processing thereof by the legal service provider. However, through the use of frames there is also provided links to all of the various files or other portions of the web site.

"Questionnaire"

This interface provides the client with an interrogative interface in the form of a questionnaire suited to the category or combination of categories selected by the client. Thus the system will retrieve a questionnaire which elicits information from a client which is appropriate for completing an immigration/naturalization application in accordance with the category/categories selected by the client in the Application Category Selection Indication file. The connection to this file can be secured in the known ways so that the information submitted by the client is kept secured.

Sitemap

This file is a list of hyperlinks to various files on the system. The hyperlinks are presented in outline form thereby enabling a client to quickly locate and go or return to a specific file or portion thereof.

"Select Your Visa"

This site essentially provides some basic introductory information as to the nature of the system and navigation therethrough and hyperlinks to at least three other sites: an application category selection indication file, "Visa Select$^{SM}$," "E-Consultation$^{SM}$" and "Eligibility." Basic information as to these sites is provided to guide a client or user through the selection process between these hyperlinked sites.

Application Category Selection Indication File

In this file, a client indicates, by checking a box, under which immigration/naturalization category an application is to be submitted by the legal services provider. To that end, there are presented in tabular form various non-immigrant visa, immigrant visa, naturalization and work permit categories under which the client can proceed, as well as combinations of the foregoing. The client can simply check those boxes that apply and the system will use that information to select an interrogative interface, such as a questionnaire, appropriate for gathering data from the client to enable the legal services provider to process the application.

"Eligibility"

This site or file contains informative text relating to eligibility criteria for various visa and naturalization application categories together with relevant fee information. The client can peruse this site to determine visa and citizenship eligibility requirements to thereby select the category suited for the client. The criteria are determined by governmental requirements. Of course, due to the large number of visa categories and related criteria, the actual information provided can be quite extensive.

Moreover, for ease of perusing by the client, the information preferably is presented in the form of numerous tables by visa category.

"Visa Select$^{SM}$"

As an alternative to requiring a client to peruse the "Eligibility" file to enable the client to determine which visa category to select, an interactive interface is provided. In this interface, referred to herein as the "VisaSelect$^{SM}$" interface, a client navigates a series of questions in succession, the selection of each question by the system depending upon the response to the previous question. Thus a client who is unsure as to what visa category to select can instead respond to a series of questions and the system will offer, i.e., recommend, appropriate visa categories for selection.

Again, in the "VisaSelect$^{SM}$" interface, the client will answer various questions in succession. Each following question is determined by each answer and no client will answer all questions. After the final question, recommendations by the system will be made of the most appropriate visa application for the client to enter the United States. The recommendations can be cumulative, i.e., a client may qualify under one or more categories.

In Appendix pages 50–66, there are presented the specific questions useful for generating such an interface in the context of a visa category selection process. These questions can be processed by a software based process known as the "Calypso Formula Parser and Evaluator," a product proprietary to Calypso System Solutions, Inc., a corporation of the State of Illinois. Notations to the programmer as to specific branching or jumps to subsequent questions and/or recommendations are included in Appendix pages 50–66. The Calypso Formula Parser and Evaluation program converts the various questions and selections of criteria into navigable HTML files, in which files, or portions thereof, are presented in succession by actions taken or indicators made by a client.

"Processing Times"

This file provides textual information, preferably in tabular form, as to expected and/or current governmental processing times and priority dates for various application categories and governmental regions. The information itself is available from government sources such as the Immigration and Naturalization Service. However, personal experiences of the legal service provider could also be included.

"Frequently Asked Questions"

This file, as its designation implies, contains textual information in the form of a series of questions and responses deemed to constitute commonly asked questions. In the present system, access to this file is restricted to those persons who have secured an account number and password.

"Disclaimers"

This site provides one or more disclaimers disclaiming legal representation and solicitation in accordance with the rules of professional responsibility of the various relevant jurisdictions in the United States.

"What's New"

This site provides information, currently in a textual format, as to news relating to the site and/or the visa application process. Of course, any other information such as general news items of interest to visa applicants could be included. There also can be included links to or reproductions of news items released by the Immigration and Naturalization Service.

"Your Account"

This file allows a client or user to obtain information relevant to the progress of their visa application in a secure fashion. The information provided can constitute secure attorney-client information and/or other information.

Essentially, this file is the first link in a series of interfaces presented to a client seeking access to their account information. As described below, In order to receive status information regarding one's account, a client inputs an account designator, such as a number, and a password via an appropriate interface. In response, the system presents to the client the status information and other information contained within the legal service provider's database (described below) for the designated account.

For extra security, the system can use any of the known secure transaction schemes, including, e.g., encryption, as are typically used by servers on the Internet.

Via this interface, a client who has already engaged the legal services provider and has obtained an account number and password, can review the status of their application, check their account balance, submit queries, and review responses to such queries, twenty-four hours a day.

"E-Consultation$^{SM}$"

This interface/site provides interactive or near interactive communication with a client or user. The site is constructed to receive inquiries and other communications from a client or user, as described further below. An inquiry received via this interface is stored in the system database for review by the legal service provider personnel. This review can be done remotely by the computer 18 or by someone working at the server 14. A response is then provided to the client, preferably by posting a response in the client's account database which the client can access after being notified by electronic mail as to the posting of a response. However, encrypted e-mail and/or true real-time communications via known "chat" features, if a system administrator is online and viewing inquiries as they are posted, are also contemplated should sufficient communications be available. Preferably, access to this interface is restricted to those clients accorded account numbers and passwords.

In addition to the foregoing, at the home page, and/or some other suitable page, the system can present a link to files containing other useful information such as housing referral services, immigration assistance services, etc. The options are virtually limitless, but presently are contemplated to be limited to files and/or sties which may be of use or assistance to immigration-naturalization applicants.

Navigating the System

With the foregoing descriptions in mind, reference will now be made to FIGS. 2A–2E, 3A and 3B for a further description of the system.

Figure 2A:
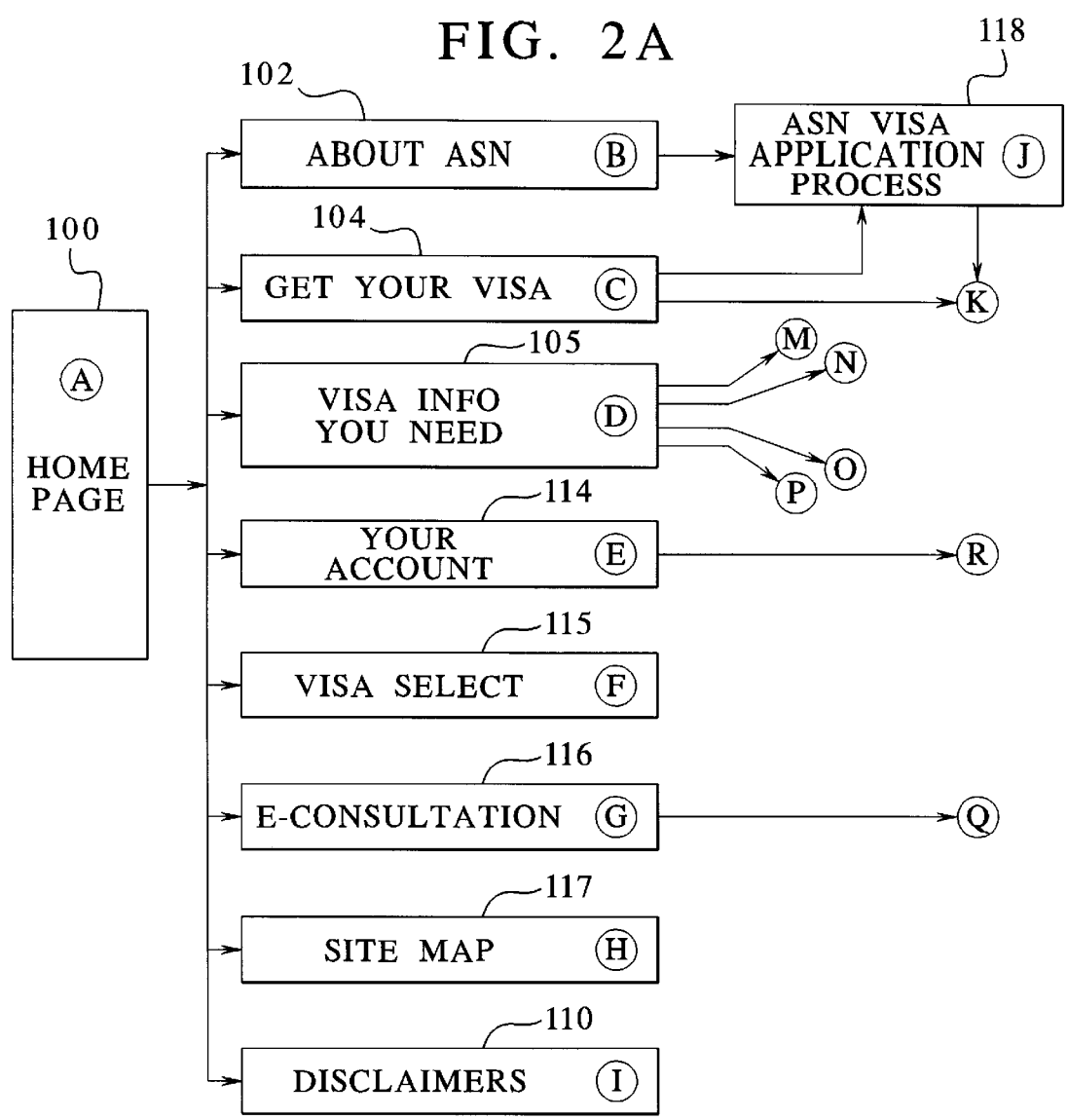

As illustrated in FIG. 2A, the client is presented with a home page 100 at the most basic URL address. From the home page, the client can then hyperlink, directly or via the frames panel, to different pages including the "About ASN" page 102, the "Get Your Visa" page 104, the "Visa Info You Need" page 105, the "Your Account" interface 114, the "Visa Select$^{SM}$" interface 115, the "E-Consultation$^{SM}$" interface 116, the sitemap page 117, and the "Disclaimers" page 110.

If the "About ASN" page 102 is selected, then from there the user can link to the "ASN$^{SM}$ VISA Application Procedure" information page 118. This latter page describes the processing being described in the following paragraphs, however, it is presented specifically to a user.

The "ASN$^{SM}$ Visa Application Procedure" page 118 also includes a link to the "Select Your Visa" page 119, described below. Thus, after reviewing the information on page 118, a client can proceed with the selection of an immigration/naturalization application category in accordance with the procedures and interfaces associated with the "Select Your Visa" page 119.

Figure 2B:
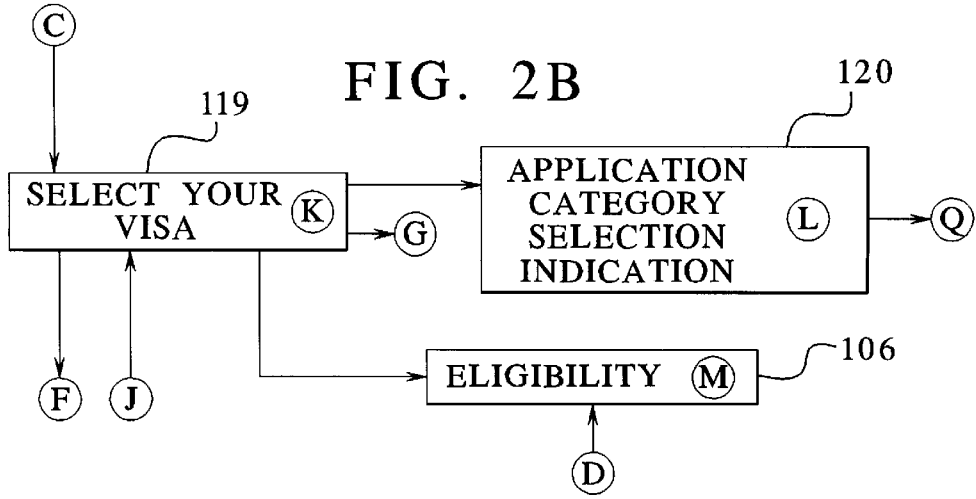

If the "Get Your Visa" site 104 is selected, then the client, in addition to some basic information, is presented with a selection of linking to either of two other pages: the "ASN$^{SM}$ Visa Application Procedure" informative page 118 and the "Select Your Visa" page 119 (see FIG. 2B).

If the "Visa Info You Need" page 105 is selected, the client is presented with a selection of links to the "Eligibility" information page 106 (see FIG. 2B), the "Processing Times" information page 108 (see FIG. 2E), the "What's New" information page 112 (see FIG. 2E), and the "Frequently Asked Questions" informative page 113 (see FIG. 2E).

If the client initially selects the "Your Account" interface 114, then the client is directed through the account accessing procedure wherein the client is presented with interfaces and interrogatories structured to permit access only to those authorized to do so. Among those authorized to do so would be client who have established an account with the legal services provider and who have completed the retainer acknowledgment procedure.

In FIG. 2D, the account accessing procedure is illustrated. As illustrated, after the "Your Account" site 114 is selected, the client is prompted to enter an account number and password, which would have been previously provided. As indicated in FIG. 2D, this interface is also reached from a link from the "Frequently Asked Questions" site 113 as that site is subject to restricted access as well.

After the system has confirmed access authorization via any of the known methods, the client is presented with a display of data relating to their account via an interface 136. This interface is also illustrated in FIG. 6.

The interface or page 136 also includes hyperlinks to the restricted access "Frequently Asked Questions" page 138, the post query interface 140 and the "Log Onto Another Account" interface 142. Thus, after reviewing the account data, the client can then select between linking to the "Frequently Asked Questions" page 138, linking to the inquiry posting page 140 which will present an interface similar to the "E-Consultation$^{SM}$" page, but which will not again present an access number and password once the query is received, and logging onto another account, i.e., beginning again at page 134.

Returning again to the home page 100, if the client selects the "E-Consultation$^{SM}$" interface link 116, then the client is presented with a series of interfaces for the submission of a query via what is referred to herein as the "E-Consultation$^{SM}$", which is a process for posing an inquiry to the legal services provided. After selecting to submit a query via the "E-Consultation$^{SM}$", the client is then presented with the "Retainer Acknowledgment/Payment" page 124. At this page, the client is requested to review and indicate agreement with a retainer agreement in which engagement of the legal services provider is acknowledged and agreed to and via which a client must present a credit card payment in an amount suitable to cover the retainer. Once the retainer is acknowledged and paid, the client is then directed to the "E-Consultation$^{SM}$" interface 126.

The "E-Consultation$^{SM}$" interface 126 preferably merely comprises a simple interface with a dialog box sufficiently large enough to allow a client to type in a query.

After a client has presented an inquiry via the interface 126, the system will then present present the client with their unique account access number and password via an interface 132. That account access number and password can then be used by the client to access data relating to that client's account via the "Your Account" procedure described above. The client is notified by e-mail as to the posting of a response in their account database.

At present, the "E-Consultation$^{SM}$" process does not invoke a client's e-mail software because of the desire to maintain confidentiality in communications. However, should a suitable security arrangement be available, alternatively, the interface could launch a client's e-mail software and automatically insert the requisite addressing information and subject matter identification. The legal service provider can then respond to the query via return e-mail or as set forth above.

With reference to FIG. 2B, the process and interfaces associated with the "Select Your Visa" page 119 are now described. As illustrated and as described above, the "Select Your Visa" page 119 is reached by selection of a link thereto on the "ASN$^{SM}$ Visa Application Procedure" page 18 and the Get Your Visa page 104. This page then presents the client with a set of options for procedures for selecting an immigration/naturalization category under which an application should be processed. These options, to which links are provided, include: (1) Indicating directly the category, if already known, via the application category selection indication page 120; (2) reviewing the "Eligibility" page 106, an then returning to the page 119 so as to then link to page 120; (3) using the "Visa Select$^{SM}$" interface 115 to obtain a category recommendation, and then returning to the page 119 so as to then link to page 120; and (4) submitting a query via the "E-Consultation$^{SM}$" interface 126 so as to obtain a recommendation from the legal services provider before submitting an application request. This last link actually directs the client to page 116 so that the client is required to engage the legal services provider before a query can be submitted via the "E-Consultation$^{SM}$" interface 126.

Once a client has indicated their category selection via the interface 120, the system then directs the client to the retainer acknowledgment/payment interface 124 (see FIG. 2C). The client then engages the legal services provider as set forth previously. However, once the retainer is executed and any required payment received, then the system then selects an interrogative interface appropriate for eliciting data from the client for the selected immigration/naturalization application category. The client is then presented with such an interrogative interface 140.

Interfaces such as interrogative interface 140 are used in many websites. Some times the interface comprises a questionnaire with custom dialog boxes which directly inputs the posted responses to questions into a file. Obviously the specific layout of such an interface is not material. It is only important that the client be provided with prompts for responses and a manner in which to submit the responses. Preferably, the interface 140 is such a questionnaire and thus constitutes the "Questionnaire" file referred to above.

In FIGS. 4A–4D there is presented a particular such questionnaire or interrogative interface for what is referred to as and A-1 application. FIGS. 4A–4D should be self-explanatory.

As illustrated in FIG. 2C, if the questionnaire 140 is completed and submitted, then the system will perform a matching between the responses to the questionnaire and the applicable questions on the immigration and naturalization service forms identified on the application category selection indication page 120. Additionally, the system will indicate that the application was received at 129 and provide the client with a user access number and password as was the case in connection with the "E-Consultation$^{SM}$" inquiry.

With respect specifically to the preferred embodiment, namely the provision of a system for processing visa applications, the data requested is indeed material, to the extent the responses comprises data needed to complete a visa application form, as required by the INS. The interface presented in FIGS. 4A–4D is intended to gather information for completion of a visa application form as required by the INS.

Figure 3A:
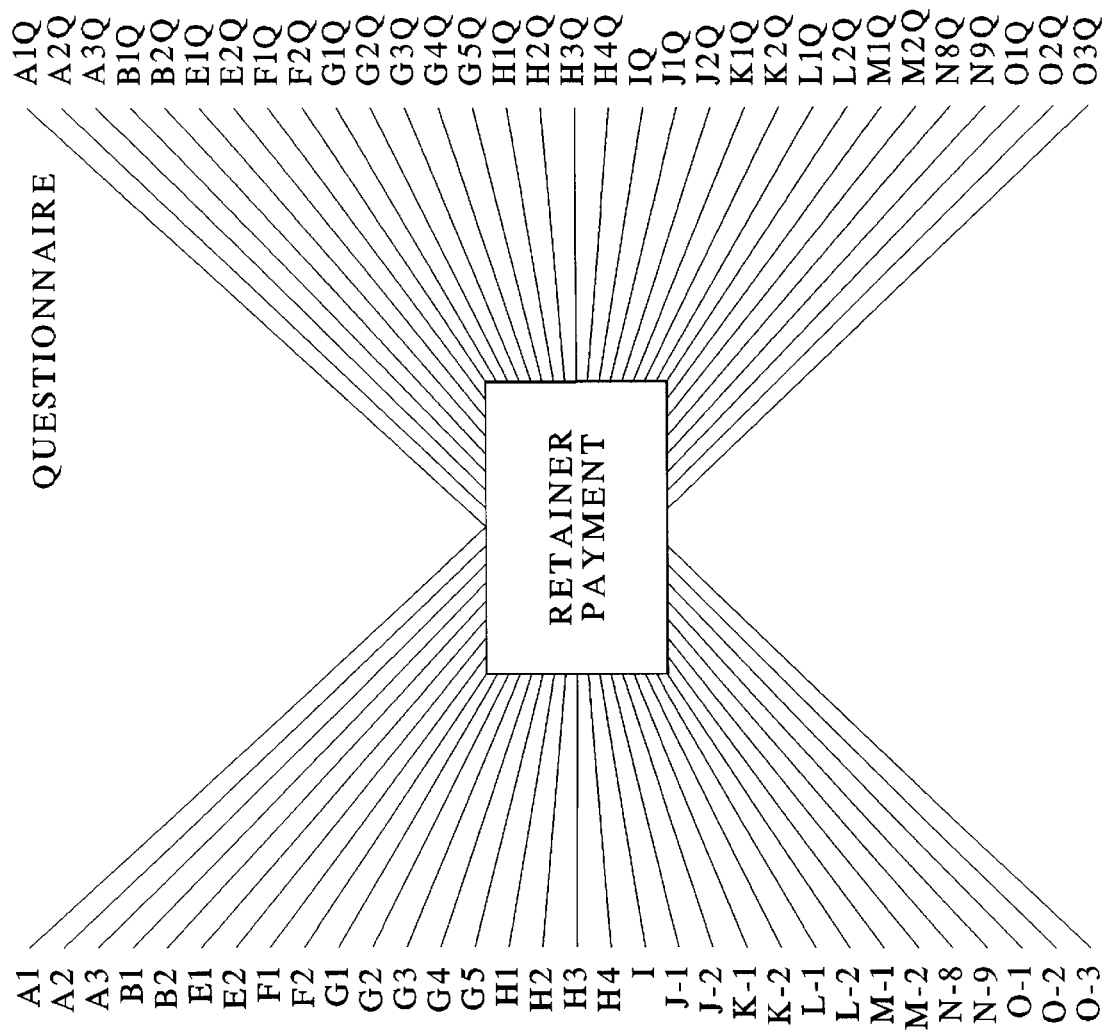
FIGS. 3A and 3B illustrate a gating function provided by an engagement acknowledgment/retainer requirement before the legal services provider is engaged.
Figure 3B:
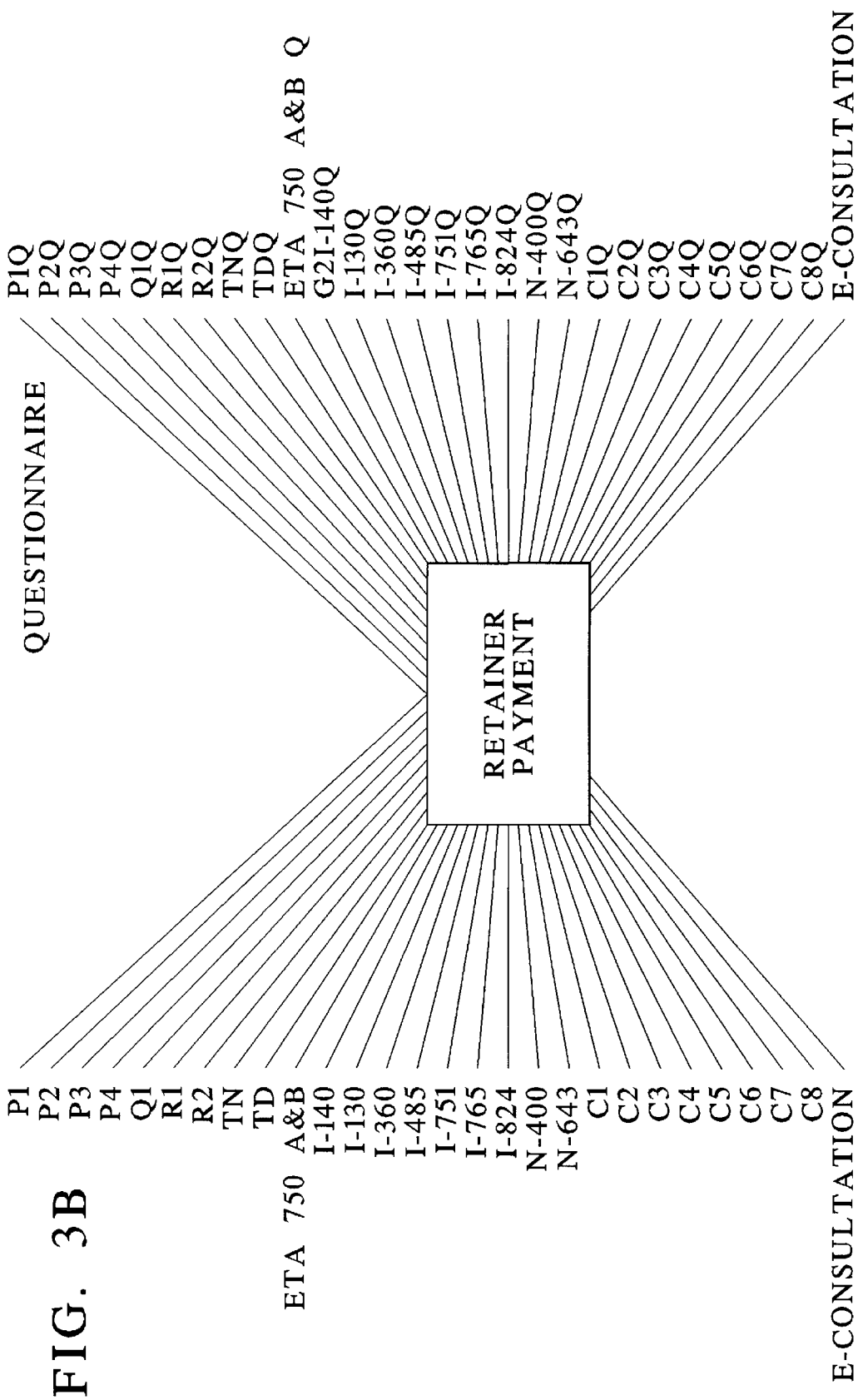

The matching between the responses in the questionnaire 140 and the applicable INS forms is indicated by FIGS. 3A and 3B. It is also indicated in FIGS. 3A and 3B that the system will check to ensure that the retainer acknowledgment/payment was received before proceeding with the questionnaire.

With reference to FIGS. 3A and 3B, it is indicated therein that the answers to the questionnaire such as the questionnaire presented in FIGS. 4A–4D, are mapped to corresponding INS forms that are prepared by the legal service provider. In this case, there is practically a direct mapping between the responses and similar spaces on the forms. FIGS. 4A–4D merely present a template of the type of questionnaire to be presented to the client. In that regard, the questionnaire will be suited to the visa application to the client. Such different types of visas are well known at least to those in the relevant field.

FIG. 5 presents administrative database matrix useful in practicing the invention which an administrator can call up after accessing the server 14. In that regard, the server 14 in FIG. 1 includes a database with information concerning the various matters for which the services provider has been retained. The database includes detailed information as to each matter and/client, and FIGS. 7A–7C illustrate the details stored for a given client. FIG. 5 illustrates a quick look-up matrix available to an administrator.

In a first column of the illustrated matrix, there is included a field for an account folder number that comprises the account number given a client when the client has engaged the legal services provider as described above. This number also serves as a hyperlink for accessing the detailed information for an account, as set forth below in connection with the description of FIGS. 7A–7C.

In a second column of the matrix there is provided a field for the name of the client. This field could also serves as a hyperlink if so desired.

In a third column, the database provides a field for information that identifies the type of service requested. By way of example, in FIG. 5, the client Joan Q. Public has submitted an inquiry via the E-Consultation$^{SM}$ page, and this is noted in the third column of the matrix. A second client, Jim Smith, has presented a request for processing of an A-1 visa.

In a fourth column, the matrix includes a field for indicating the status of a matter, i.e,. either open or closed or terminated.

In a fifth column, the matrix includes a field for identifying the date and time of day when a matter was presented to the legal services provider.

Finally, in a sixth column, there is included a field for indicating the status as to whether the matter has been processed, i.e., the account can still be open if a visa application has been processed, but there are still issues to be resolved.

It can be appreciated that any of the fields above could serve as hyperlinks to other information files. For example, the visa category designator cold be entered as a hyperlink to the relevant information in the "Eligibility" page 106 thereby allowing the administrator to quickly refresh their recollection as to the type of visa involved. As another example, creating the sixth field as a hyperlink to a notations file would enable the administrator to quickly link to the notations file to be informed as to details on the progress of a matter.

In FIGS. 7A–7C, there is presented an administration page via which the legal services provider can administer the system by managing the various accounts set up in the system. With reference again to FIG. 5, it is indicated that the account folder numbers are written so as to comprise HTML links to the respective administration page as illustrated in FIGS. 7A–7C. These administration pages illustrated in FIGS. 7A–7C provide much fuller information than is available on the database matrix. On this page, the administrator or legal services provider can review the complete information relating to the given matter, including all of the queries and responses posed as well as the other information relating to account balances, addresses, etc.

Obviously, access to the administrator pages in FIGS. 5 and 7A–7C is suitably restricted to the administrator or legal services provider by suitable means such as password protection.

In FIG. 6, there is presented, as described above, a response page in which would be presented a response to an account status inquiry posed by a client following the "Your Account" procedure described above. In this page, there is provided a statement as to account status, as well as a list of queries posed and responses posed. Finally, there is included an account balance summary so that the client can immediately access information regarding the balance due, overpayments, etc.

It can be appreciated that the foregoing system provides a very efficient and cost effective system for the receipt and processing of application information for the processing of visa applications. The legal services provider can be engaged without having to engage in telephonic or personal interviews and further can receive and respond to inquiries via e-mail. Yet further, the system allows the provider to do the foregoing remotely from the server(s) which interact(s) with the clients.

From the foregoing description, it can be seen how a legal services provider can provide legal services via a network, such as the Internet, in a cost effective manner. In such system, the legal services provider can be engaged in real time and conduct an initial interview via interactive computer interfaces without involving a human other than the client or potential client. The legal services provider can then process data received from the interview and provide the service requested. Further communications between the client and the legal services provider can be mostly limited to electronic communications, except in those instances where hard copies of documents with original signatures (until electronic authentication is acceptable) are required. This limited involvement of the legal service provider's personnel frees up their time so that many more matters can be attended to during the course of a day. Moreover, clients can gain instant access to information about their matters without interrupting the legal service provider's personnel.

Although modifications and changes may be suggested by those skilled in the art, it is the intention of the inventors to embody within the patent warranted hereon all changes and modifications as reasonably and properly come within the scope of their contribution to the art.

What is claimed is:

1. A network based system for conducting legal services, comprising:
    (a) an interrogative interface accessible from said network via which a human client submits information relevant to a legal service matter in connection with which a legal service provider is engaged;
    (b) a retainer acknowledgment interface accessible from said network via which said human client acknowledges engaging the legal service provider to perform a legal service, said retainer acknowledgment interface facilitating an offer by said human client for said legal services provider's acceptance to form a contract for said legal services provider to provide legal services;
    (c) a query interface accessible from said network via which said human client can post inquiries to the legal services provider; and
    (d) a database comprising information relating to the status of one or more legal service matters for which said human client has engaged the legal service provider.

2. The system of claim 1, wherein the interrogative interface comprises an interactive questionnaire.

3. The system of claim 1, wherein the system is configured to not receive data via the interrogative interface or a query via the query interface, unless said human client has acknowledged retaining the legal services provider via the retainer acknowledgment interface.

4. The system of claim 2, wherein the interrogative interface comprises a plurality of selectable interactive questionnaires which are selectable by the clients.

5. The system of claim 1, comprising an administrative interface comprising a matrix comprising a subset of data from the database, including matter status information.

6. The system of claim 1, further comprising another interrogative interface in which clients are presented with a succession of questions wherein subsequent questions in the succession of questions are selected in view of responses to preceding questions in the succession of questions.

7. A network based system for processing of an immigration/naturalization application by a legal services provider, comprising:
   (a) an interrogative interface accessible from said network via which a human client inputs personal data relevant for an immigration/naturalization application;
   (b) a retainer interface accessible from said network via which said human client acknowledges engaging the legal services provider and submits a payment, said retainer interface facilitating an offer by said human client for said legal services provider's acceptance to form a contract for said legal services provider to provide legal services;
   (c) a query interface accessible from said network via which said human client can post inquiries to the legal services provider;
   (d) a computer database comprising data relating to various matters for which the legal services provider has been engaged;
   (e) an administrative interface comprising a matrix for listing matters for which the legal services provider has been engaged and data including the status of such matters.

8. The system of claim 7, wherein the interrogative interface comprises an interactive questionnaire.

9. The system of claim 7, wherein the system is configured to not receive data via the interrogative interface or a query via the query interface, unless the said human client has acknowledged retaining the legal services provider via the retainer acknowledgment interface.

10. The system of claim 8, wherein the interrogative interface comprises a plurality of selectable interactive questionnaires which are selectable by the clients.

11. The system of claim 7, comprising an administrative interface comprising a matrix comprising a subset of data from the database, including matter status information.

12. The system of claim 7, further comprising another interrogative interface in which clients are presented with a succession of questions wherein subsequent questions in the succession of questions are selected in view of responses to preceding questions in the succession of questions.

13. A network based system for providing legal services to immigration/naturalization applicants comprising:
   (a) one more servers operatively connected to a said network;
   (b) an interrogative interface accessible from said network via which said applicant can submit data useful in completing a governmental form for applying for an immigration/naturalization application visa;
   (c) a retainer acknowledgment interface accessible from said network via which said applicant submits a payment;
   (d) a query interface accessible from said network via which said applicant can post inquiries; and
   (e) an account access interface accessible from said network via which said applicant can view information relating to processing of data submitted via said interrogative interface.

14. The system of claim 13, further comprising a second interrogative interface via which said applicant can obtain a suggested visa category under which said data can be submitted, said second interrogative interface configured to present a succession of selectable queries to said applicant wherein subsequent queries in said succession of queries are selected by said system based upon responses by said applicant to preceding queries in said succession of queries.

15. The system of claim 13, further comprising an administration interface via which a remote administrator can review all information relating to a specified account for said applicant.

16. The system of claim 15, further comprising another administration interface via which said administrator can review a summary of an account of said applicant.

17. An internet based legal services network system, comprising:
   a network;
   a database comprising information relating to matters for which a legal services provider has been engaged including queries posed by clients and responses thereto;
   one or more remotely accessible servers on which said database is stored;
   an administration interface accessible from a world wide web associated with said internet for accessing information in said database, said administration interface being only accessible by said legal services provider;
   a retainer acknowledgment interface accessible from the world wide web via which clients acknowledge engagement of the legal services provider; and
   a software module accessible from the world wide web which accepts a message submitted by the client and processes same only if a client has acknowledged engagement of the legal services provider and submitted a payment via the retainer acknowledgment interface.

18. The network based system of claim 1, wherein said network is a world wide web.

19. The network based system of claim 7, wherein said network is the internet.

20. The network based system of claim 13, wherein said network is the internet.

* * * * *